(12) United States Patent
Slimko et al.

(10) Patent No.: US 10,604,087 B2
(45) Date of Patent: Mar. 31, 2020

(54) HEAT SHIELD WITH SEALING MEMBER

(71) Applicant: Lydall, Inc., Manchester, CT (US)

(72) Inventors: Gregory M. Slimko, La Baule (FR);
Julien Forgeard, Saint Nazaire (FR);
Paul Schlappa, Schalksmühle (DE);
John M Lowry, Brooklyn, MI (US)

(73) Assignee: LYDALL, INC., Manchester, CT (US)

( * ) Notice: Subject to any disclaimer, the term of this patent is extended or adjusted under 35 U.S.C. 154(b) by 0 days.

(21) Appl. No.: 15/573,037

(22) PCT Filed: Jun. 1, 2016

(86) PCT No.: PCT/US2016/035157
§ 371 (c)(1),
(2) Date: Nov. 9, 2017

(87) PCT Pub. No.: WO2016/196550
PCT Pub. Date: Dec. 8, 2016

(65) Prior Publication Data
US 2018/0141504 A1  May 24, 2018

Related U.S. Application Data

(60) Provisional application No. 62/169,641, filed on Jun. 2, 2015.

(51) Int. Cl.
*B60R 13/08* (2006.01)
*F01N 13/10* (2010.01)
(Continued)

(52) U.S. Cl.
CPC ...... *B60R 13/0838* (2013.01); *B60R 13/0876* (2013.01); *F01N 13/102* (2013.01);
(Continued)

(58) Field of Classification Search
CPC . B60R 13/0838; B60R 13/0876; B60R 13/08; B60R 13/0815; B60R 13/06;
(Continued)

(56) References Cited

U.S. PATENT DOCUMENTS 5,196,253 A * 3/1993 Mueller ................. B32B 3/266
181/211
5,347,810 A    9/1994 Moore, III
(Continued)

FOREIGN PATENT DOCUMENTS

DE    102011086080 A1 *  5/2013  ............. B60R 13/08
DE    202014003108 U1    3/2015
(Continued)

OTHER PUBLICATIONS

International Search Report and Written Opinion of International Appl. No. PCT/US2016/035157, dated Sep. 23, 2016, 20 pgs.
(Continued)

*Primary Examiner* — Hung Q Nguyen
*Assistant Examiner* — Brian P Monahon
(74) *Attorney, Agent, or Firm* — Cantor Colburn LLP

(57) ABSTRACT

According to an aspect, the present embodiments may be associated with a heat shield including a sealing member. In an embodiment, the sealing member is positioned along at least a portion of a partially hemmed edge and retained thereby. Thus, the heat shield is capable of providing insulative and/or sealing properties when used, specifically thermal, vibrational and/or acoustical shielding, as well as limiting fluid flow across the edge of the heat shield.

18 Claims, 7 Drawing Sheets

(51) Int. Cl.
*F01N 13/14* (2010.01)
*F02B 77/11* (2006.01)

(52) U.S. Cl.
CPC .............. *F01N 13/14* (2013.01); *F02B 77/11* (2013.01); *F01N 2260/08* (2013.01); *F01N 2260/20* (2013.01)

(58) Field of Classification Search
CPC .... B60R 13/0869; F02B 77/11; F02B 29/045; F02B 2019/006; F02B 77/08; F02B 77/13; F01N 13/102; F01N 13/14; F01N 2260/08; F01N 2260/20; F01N 13/1827; F01N 2510/02; F01N 2510/04; F01N 13/148

See application file for complete search history.

(56) References Cited

U.S. PATENT DOCUMENTS

| | | | |
|---|---|---|---|
| 5,550,338 A * | 8/1996 | Hielscher | B32B 3/10 181/290 |
| 5,670,264 A * | 9/1997 | Sheridan | E04B 1/78 428/594 |
| 5,996,730 A * | 12/1999 | Pirchl | B60R 13/0876 123/195 C |
| 6,052,887 A * | 4/2000 | Dziadosz | B21D 39/021 29/243.5 |
| 6,123,172 A | 9/2000 | Byrd et al. | |
| 6,251,498 B1 * | 6/2001 | Fukushima | B60R 13/0876 428/164 |
| 6,276,044 B1 * | 8/2001 | Ragland | B21D 13/00 29/521 |
| 6,302,466 B1 * | 10/2001 | Zwick | B60R 13/08 296/39.3 |
| 6,581,720 B1 | 6/2003 | Chen et al. | |
| 6,598,389 B2 | 7/2003 | Chen et al. | |
| 6,647,715 B2 | 11/2003 | Farkas | |
| 6,660,403 B2 * | 12/2003 | Ragland | B21D 13/00 428/594 |
| 6,797,402 B2 | 9/2004 | Chen et al. | |
| 6,966,402 B2 * | 11/2005 | Matias | B32B 7/02 181/290 |
| 6,994,901 B1 * | 2/2006 | Chen | F01N 1/24 29/462 |
| 7,870,931 B2 * | 1/2011 | Wildhaber | B60R 13/0876 181/293 |
| 7,926,615 B2 * | 4/2011 | Smatloch | F01N 1/02 181/211 |
| 8,104,573 B2 | 1/2012 | Oxenknecht et al. | |
| 2001/0012552 A1 * | 8/2001 | Cota | F02B 77/11 428/76 |
| 2006/0124387 A1 * | 6/2006 | Berbner | B22F 3/002 181/290 |
| 2008/0001431 A1 * | 1/2008 | Thompson | B32B 5/26 296/187.01 |
| 2008/0075912 A1 * | 3/2008 | Malinek | B60R 13/0838 428/71 |
| 2008/0096451 A1 * | 4/2008 | Haerle | B60R 13/0876 442/221 |
| 2008/0169038 A1 * | 7/2008 | Sellis | B32B 1/08 138/149 |
| 2008/0289902 A1 * | 11/2008 | Krus | B60R 13/0838 181/290 |
| 2010/0035078 A1 * | 2/2010 | Staudt | B32B 3/28 428/596 |
| 2011/0067952 A1 * | 3/2011 | Oxenknecht | B60R 13/0876 181/284 |
| 2011/0305878 A1 * | 12/2011 | Gladfelter | B32B 3/30 428/195.1 |
| 2015/0033746 A1 | 2/2015 | Carey et al. | |
| 2015/0158267 A1 * | 6/2015 | Stuckey | B60R 13/0876 428/138 |

FOREIGN PATENT DOCUMENTS

| | | |
|---|---|---|
| EP | 0486427 A1 | 5/1992 |
| FR | 2892679 A1 | 5/2007 |

OTHER PUBLICATIONS

Lydall, Inc., Thermal and Acoustical Systems, Vibration Damped Aluminum Metal Shields, http://www.lydallautomotive.com, Jun. 21, 2015, 3 pgs.
Dana, Victor Reinz® Insulated and Damped Heat Shields, http://www.dana.com/light-vehicle/products/both-transmission-and-engine-technologies/heat-shields/, Jul. 29, 2016, 2 pgs.
Dana, Thermal-Acoustical Protective Shielding (TAPS), http://www.dana.com, 2008, 2 pgs.
The State Intellectual Property Office of the People's Republic of China, Notification of First Office Action for CN App. No. 201680029844.6, which is in the same family as U.S. Appl. No. 15/573,037, dated Jun. 5, 2019, 16 pages.

* cited by examiner

HEAT SHIELD WITH SEALING MEMBER

CROSS-REFERENCE TO RELATED APPLICATIONS

This application claims priority to International Application No. PCT/US2016/035,157 filed Jun. 1, 2016, which claims the benefit of U.S. Provisional Application No. 62/169,641 filed Jun. 2, 2015, each of which is incorporated herein by reference in its entirety.

FIELD

A device and a method for providing a heat shield with a sealing member that provides an insulating effect while at least limiting air and/or liquid from flowing thereby is generally described.

BACKGROUND

Thermal and/or thermal-acoustical shields, to which the presently described embodiments are an improvement, have long been known in the art. Such shields are used in a wide variety of applications, among which are shielding in space crafts, automobiles, home appliances, electronic components, industrial engines, boiler plants and the like, and are commonly referred to as heat shields, acoustical panels, thermal barriers, vibrational barriers, acoustical barriers, insulating shields, and the like. As used herein, such terms are considered interchangeable. Some of such shields have proportionally smaller thermal insulating value and proportionally higher acoustical insulating value, and vice versa. Such shields may be used, for example, between an object to be protected, e.g., thermally shielded, for example, the outer dash of an automobile, and a high temperature exhaust component such as a catalytic converter or manifold. Additionally, such shields may be designed to provide acoustical shielding and/or vibration isolation.

Known heat shields are often designed for use in vehicles such as automobiles and, as a result, are typically exposed to high and low temperatures. Some heat shields may also be exposed to a wide array of liquids, such as engine oil. Because exhaust gas temperatures in an internal combustion engine approach around 1050° C., there is a significant risk that thermally sensitive components within the passenger or engine compartment of the vehicle, which may be susceptible to such high temperatures, can be damaged. The engine compartment of the vehicle usually contains a multitude of temperature sensitive components that operate at temperatures lower than ambient air temperature in proximity to the exhaust line and a heat shield must be able to prevent this high temperature air from mixing with cooler ambient air near temperature sensitive components.

The uses of manifold shields with integrated manifold gaskets that avoid the problems outlined above are common. However, these solutions require separate forming tools and threaded fasteners at the powertrain assembly plant. Moreover, this solution is costly, heavy and does not facilitate installation and is subject to continuous and active design modifications to accommodate the continuous evolution of the powertrain assembly.

FIG. 1 is a highly stylized drawing showing a prior art heat shield 10' and a gap that is oftentimes unable to be closed using the body of the heat shield. The heat shield 10' has a metallic layer and is positioned over a heat source 60', thereby forming a hot zone H and a cold zone C. The hot zone H is located at or around the location of the heat source 60', and contains a volume of high temperature air, while the cold zone C is located away from the hot zone H and often includes lower temperature fluids, such as air and/or common automotive fluids. An edge of the heat shield 10' is positioned next to the surface of a component 70'. This position serves to prevent the egress of hot fluid from the hot zone H and into the cold zone C, while also preventing the ingress of cold fluid into the hot zone H and away from the cold zone C. A disadvantage of this heat shield is the gap between the surface of the component to be shielded and the edge of the heat shield, allows the egress of hot fluid into the cold zone C and the ingress of cold fluid into the hot zone H. While FIG. 1 shows a heat shield 10' having a substantial gap, gaps may be much smaller and still allow egress of hot fluid and ingress of cold fluid.

Current heat shield designs include heat shield components having a hemmed edge at the periphery of the heat shield and typically a deflecting portion. A disadvantage of such heat shields is that they do not efficiently provide a substantially airtight seal. Such heat shields, particularly in manifold exhaust applications, have gaps left between the edge of the heat shield and the component to be shielded. These gaps can allow gases and liquids to travel from exhaust manifolds to sensitive components or compartments, causing substantial damage. Damage to such components is often costly to repair, and in some cases, the components may be irreparable. Heat shields must be designed, therefore, in a manner that is effective in protecting components from being subjected to unwanted liquids and/or temperature differentials.

Even further, such heat shields frequently use a hemmed edge because the sharp edges of the heat shield can oftentimes be hazardous/dangerous to assemblers of the vehicles. In other words, the heat shield is typically one of the many components that must be handled by the assemblers, and providing heat shields with hemmed edges would protect against the risk of being injured by the sharp edges. Use of such hemmed edges, however, has little to no effect on air or liquid flow around the heat shield.

In view of the disadvantages associated with currently available methods and devices for providing a safe and effective heat shield, there is a need for a device and method that provides and maintains an effective air and/or liquid seal between the heat shield and component parts, and provides a lighter, more flexible and cost effective shield, while reducing the risk of injury during the assembly and/or manufacturing process.

BRIEF DESCRIPTION

According to an aspect, the present embodiments may be associated with a heat shield including a sealing member. In an embodiment, the sealing member is positioned along at least a portion of a partially hemmed edge and retained thereby. Thus, the heat shield is capable of providing insulative and/or sealing properties when used, specifically thermal, vibrational and/or acoustical shielding, as well as limiting fluid flow across the edge of the heat shield.

BRIEF DESCRIPTION OF THE FIGURES

A more particular description will be rendered by reference to specific embodiments thereof that are illustrated in the appended drawings. Understanding that these drawings depict only typical embodiments thereof and are not therefore to be considered to be limiting of its scope, exemplary embodiments will be described and explained with additional specificity and detail through the use of the accompanying drawings in which.

Figure 1:
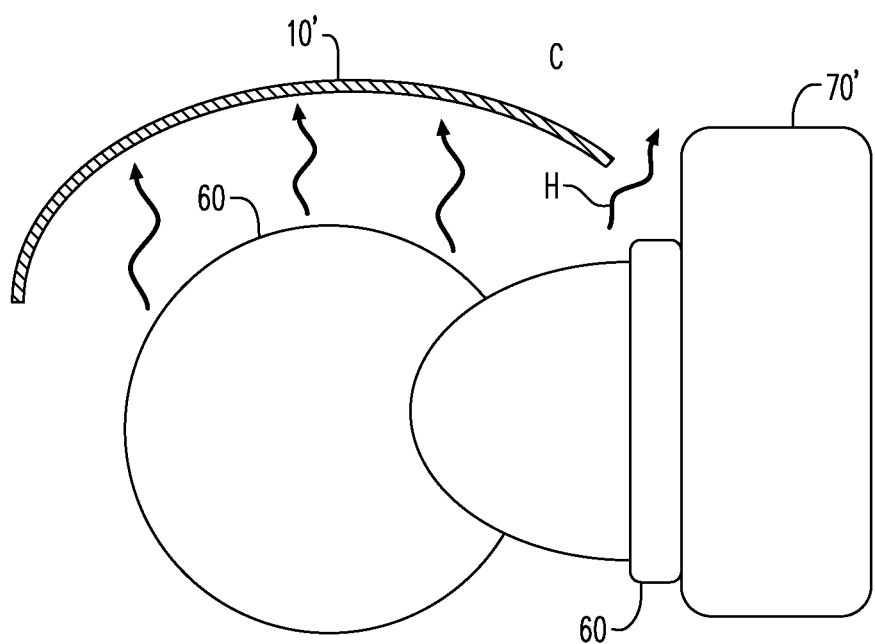
FIG. 1 illustrates a cross-sectional highly stylized view of a prior art heat shield.

Various features, aspects, and advantages of the embodiments will become more apparent from the following detailed description, along with the accompanying figures in which like numerals represent like components throughout the figures and text. The various described features are not necessarily drawn to scale, but are drawn to emphasize specific features relevant to some embodiments.

DETAILED DESCRIPTION

Reference will now be made in detail to various embodiments. Each example is provided by way of explanation, and is not meant as a limitation and does not constitute a definition of all possible embodiments.

Embodiments of the disclosure relate generally to methods and materials for providing insulative properties, specifically thermal, vibrational and/or acoustical shielding, as well as limiting air and liquid flow across components. Such materials find particular utility in vehicle and appliance compartments. For example, the materials described herein may include a moldable, self-supporting insulating shield, such as one or more metallic layers, commonly used in conjunction with an inner nonwoven layer, wherein the shield may provide thermal, vibrational and/or acoustical insulation, and limit airflow and liquid flow. The shields contemplated herein include at least a partially hemmed edge (as described in greater detail hereinbelow), with a sealing member positioned along at least a portion of the partially hemmed edge and configured for closing or otherwise sealing the gap traditionally left between currently available heat shields and one or more components being shielded. According to an aspect, the heat shield is capable of providing insulative and/or sealing properties when used, specifically thermal, vibrational and/or acoustical shielding, as well as limiting the exchange of fluid across the edge of the heat shield. To that end, the sealing member includes a semi-flexible material. In an embodiment, the sealing member provides a softened (or semi-rigid) edge enclosing the partially hemmed edge such that when positioned within a compartment, the soft edge sealing member functions to limit, if not all together eliminate air flow and/or liquid flow around the shield, thus providing an insulative and sealing effect.

As described herein, the heat shield may include metallic layers, or composite or layered materials, commonly including one nonwoven layer and two metallic layers, operable individually and/or collectively to provide thermal, vibrational and/or acoustical insulation in use. The heat shield is configured to at least limit, if not completely eliminate air flow and/or liquid flow, around the shield when positioned in the compartment.

As used herein the term "nonwoven material or fabric or web or layer" means a web having a structure of individual fibers or threads which are interlaid, but not in an identifiable manner as in a knitted fabric. Nonwoven fabrics or webs have been formed from many processes such as for example, meltblowing processes, spunbonding processes, bonded carded web processes, and needle punch (NP) felt processes.

Figure 2:
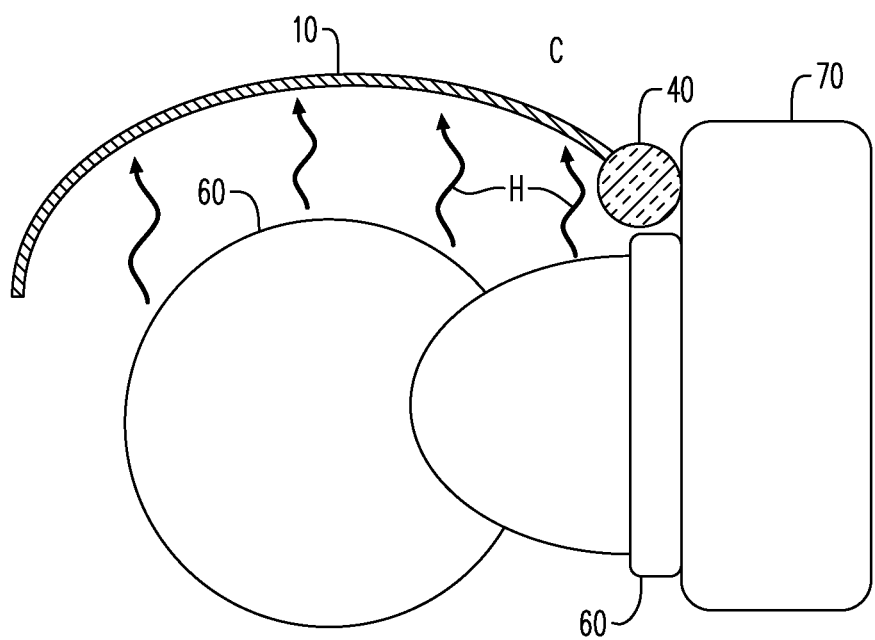
FIG. 2 illustrates a cross-sectional side view of a heat shield according to an embodiment.

Turning now to the figures, and with particular reference to FIG. 2, a heat shield 10 according to embodiments is depicted. The heat shield 10 includes a seal or sealing member 40, as will be described in greater detail hereinbelow, positioned in a sealing and shielding relationship with a heat source (thermal, acoustical and/or vibrational source) 60 and a component 70. As shown herein, the heat shield 10 is positioned within a compartment in a shielding and/or sealing relationship with the heat source 60, while the sealing member 40 is positioned in an abutting arrangement with the component 70 of the source 60. In embodiments, the sealing member 40 of the heat shield 10 directs air flow, such as hot air flow away from sensitive components, by directing such hot air flow to an end of the heat shield 10 not having a similar sealing member 40 disposed thereon. Examples of typical heat sources 60, includes one or more exhaust manifolds, turbocharges, catalytic converters or diesel particulate filters, while examples of the component 70 include the exhaust component flange, engine head, engine block, rocker cover, head cover or beauty cover. While not specifically shown herein, it will be understood with reference to the discussion that follows that it is possible, because of the nature of the sealing member 40, to also at least partially compress the sealing member 40 when positioned within the compartment.

Figure 3A:
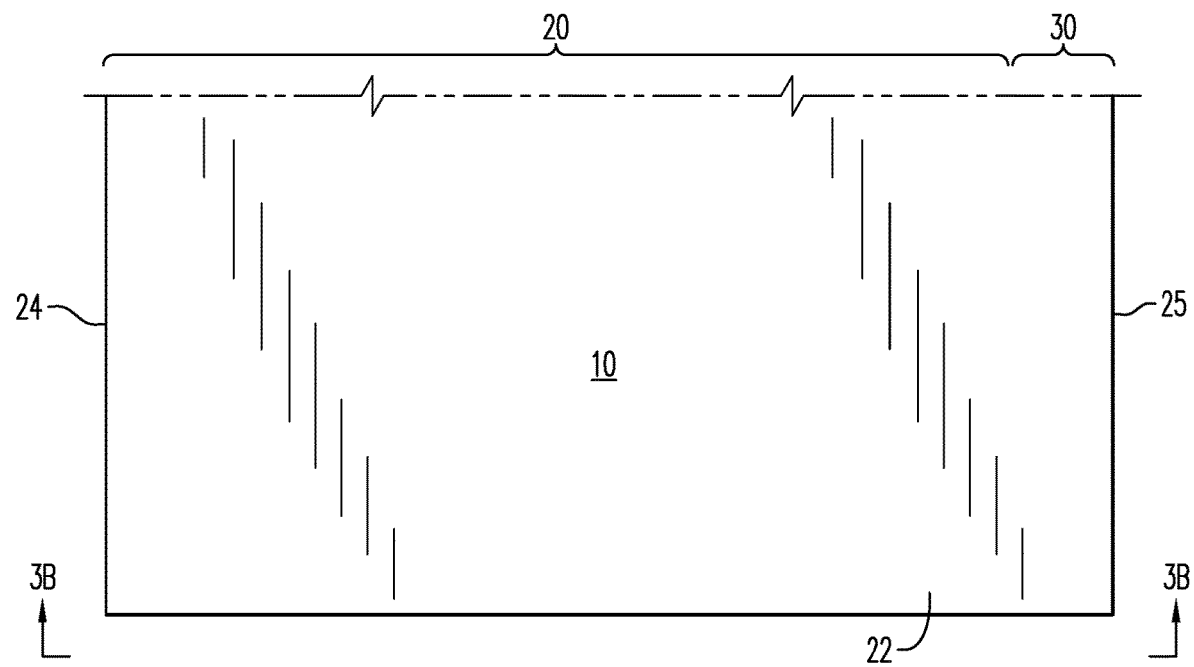
FIG. 3A is a top view of a highly stylized, unformed heat shield according to an embodiment.

As displayed in further detail in FIGS. 3A-3D, various views of a heat shield are depicted. In FIG. 3A, the heat shield 10 is depicted as an unformed metal sheet, having a substantially flattened surface prior to being dimensioned/molded into a shape. In embodiments, the shape of the heat shield 10 is selected to be complimentary to a volume of space, such as a vehicle compartment, in which the heat shield 10 will be mounted. In some embodiments the heat shield 10 is a profiled surface. In some embodiments, the heat shield may be formed of one of more metallic layers, or composite/layered materials commonly including one nonwoven layer and at least one metallic layer. The heat shield 10 includes a first portion 20 and a second portion 30 extending therefrom. The first portion 20 of the heat shield 10 typically forms a body of the heat shield, while the second portion 30 forms a partially hemmed edge 26 (see, for example FIG. 3B). The sealing member 40 is positioned over the partially hemmed edge 26, as will be discussed in greater detail hereinbelow and with particular reference to FIG. 5. The first portion 20 of the heat shield 10 includes a first end 22 and a second end 24, both ends being positioned away from each other. As can be seen in FIG. 3A, the second portion 30 is integrally formed with the first end 22. In an embodiment, the first portion 20 has an axial length L1 that is greater than an axial length L2 of the second portion 30. As will be described in further detail below, the second portion 30 is configured to form the partially hemmed edge 26 along at least a portion of its length.

Figure 3B:
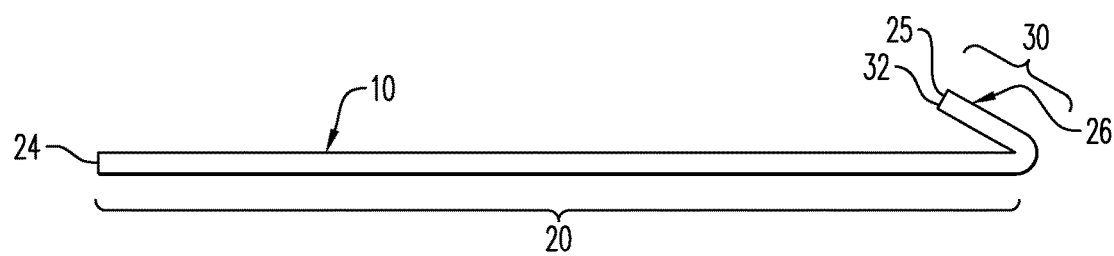
FIG. 3B is a side view of the heat shield of FIG. 3A including a hemmed edge according to an embodiment.
Figure 3C:
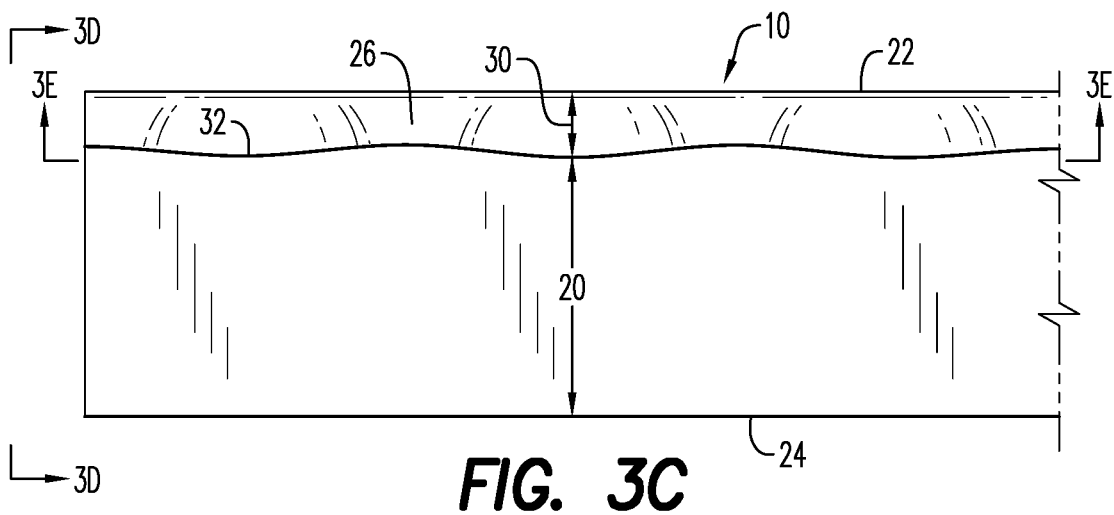
FIG. 3C is a top view of a heat shield in an unassembled manner, having a partially hemmed edge according to an embodiment.

FIGS. 3B and 3C depict an example of the heat shield 10, in an unassembled manner, having a partially hemmed edge 26. FIG. 3B depicts the axial length L2 of second portion 30 being bent/folded over towards the direction of the axial length L1 of the first portion 20. As depicted in FIG. 3C and in an embodiment, the second portion 30 forms the partially hemmed edge 26 and has a substantially smaller surface area than the first portion 20. In an embodiment, the first end 22 of the heat shield 10 is oriented in a direction towards the second end 24.

Figure 3D:
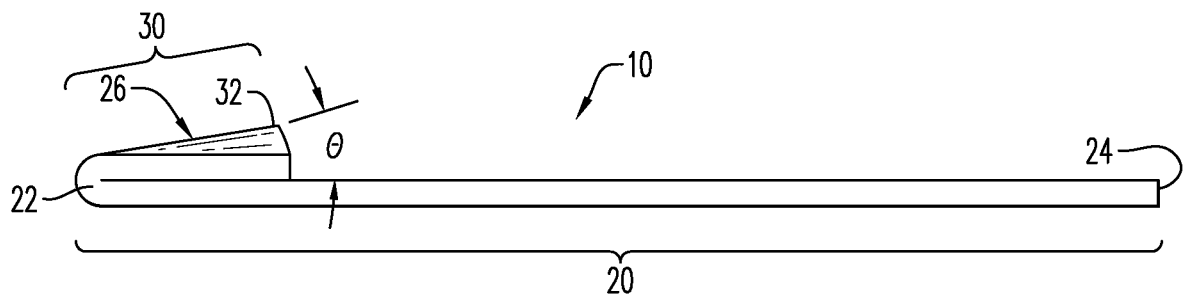
FIG. 3D is a side view of the partially hemmed edge of FIG. 3C, according to an embodiment.

Now referring to FIG. 3D, in some embodiments, the partially hemmed edge 26 of the heat shield 10 is adapted and configured to mechanically retain the sealing member 40. In some embodiments, the partially hemmed edge 26 facilitates mechanical retention of the sealing member 40 (described in further detail below) without the use of mechanical fasteners, such as threaded fasteners, rivets, clips, adhesive and the like. As displayed in at least FIG. 3D, the shape of the partially hemmed edge 26 may include a raked edge 32. The raked edge 32 is formed from the second portion 30 of the heat shield 10. The end of the partially hemmed edge 26 is oriented at an angle θ, the angle between the first end 22 and the second end 24, which may vary along a length of the edge 26 between 0 degrees and 180 degrees. The length of the raked edge 32 is such that when a sealing member 40 is positioned over and around it, the raked edge 32 essentially grabs onto the material, or fibers, of the sealing member 40. In some embodiments, the length of the raked edge 32 is only as long as it needs to be in order to form the seal.

Figure 3E:
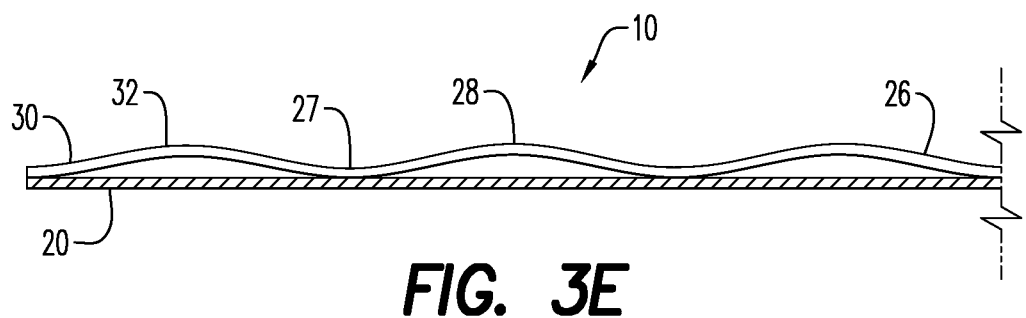
FIG. 3E is an end view of the partially hemmed edge of FIG. 3C according to an embodiment, illustrating undulating portions.

Referring now to FIG. 3E, the raked edge 32 may include alternating flattened portions (valleys) 27 and raised portions (peaks) 28. The flattened portions 27 are closer to the surface of the first portion 20 of the heat shield 10, while the raised portions 28 are positioned in a direction away from the surface of the first end 22 of the first portion 20. In some embodiments, the flattened portions 27 are flush with the surface of the first end 22 of the first portion 20. In an embodiment, the alternating flattened portions 27 and raised portions 28 of the partially hemmed edge 26 create an undulating edge. In some embodiments, the undulating edge forms a pattern, where the number of raised portions 28 is equivalent to the number of flattened portions 27. In some embodiments, the undulating edge creates a wave having peaks (raised portions 28) separated by valleys (flattened portions 27). In some embodiments the frequency of the raised portions 28 and the flattened portions 27 are irregular and/or does not correlate or repeat with each other. In yet a further embodiment, a distance between each peak and a bordering valley may form a pattern. In some embodiments, the distances between each peak and the distances between each valley may vary and/or be uneven. In some embodiments, the length and frequency of the flattened portions 27 and the raised portions 28 may vary according to the amount of retention desired and the length and thickness (or depth) of the sealing member 40.

Figure 4A:
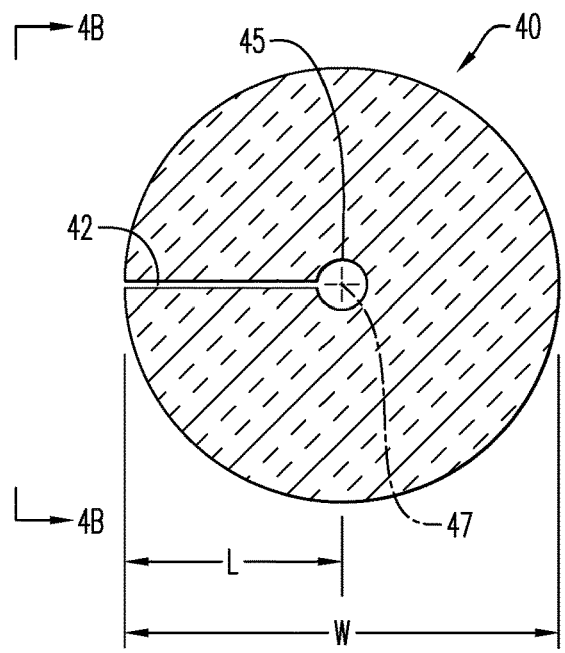
FIG. 4A is a cross-sectional view of a sealing member according to an embodiment.
Figure 4B:
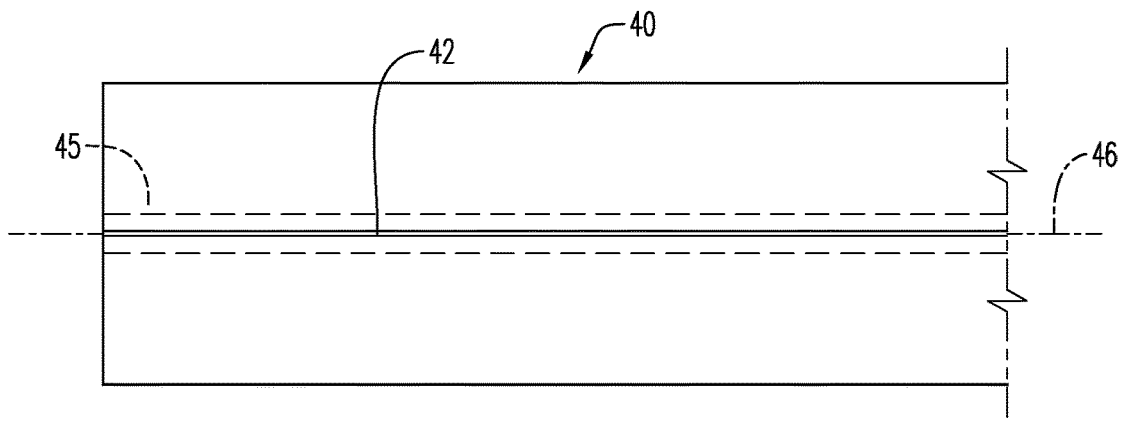
FIG. 4B is a side view of the sealing member of FIG. 4A.

FIGS. 4A and 4B depict the sealing member 40 according to an embodiment. In conjunction with the illustrated embodiment of the heat shield 10 described herein, the sealing member 40 may be positioned along at least a portion of the partially hemmed edge 26 (as will be discussed in greater detail hereinbelow and with particular reference to FIG. 5). According to an aspect, the sealing member 40 is a semi-flexible material. Thus, the sealing member 40 provides insulative and/or sealing properties, such as, thermal, vibrational and/or acoustical shielding, as well as limiting the exchange of fluid across the edge of the heat shield, when the sealing member 40 is positioned along the partially hemmed edge 26. In some embodiments, the semi-flexible material includes at least one of an organic fiber, an inorganic fiber and a metallic fiber. Each of the aforementioned fibers, and others of similar properties enables the sealing member 40 to receive and retain the partially hemmed edge 26. According to an aspect, the sealing member 40 is a mesh-like material, such as, for example, a metallic wire mesh, a metallic wire netting, and the like. In any event, the sealing member 40 may provide a softened (or semi-rigid) edge that encloses the partially hemmed edge 26, such that when positioned within a compartment, the soft edge sealing member functions to limit, if not all together eliminate air flow and/or liquid flow around the shield 10, thus providing insulative and/or sealing effects.

As depicted in FIG. 4A, the sealing member 40 has an opening 42 positioned along a longitudinal axis 46 (FIG. 4B) of the sealing member 40. In some embodiments, a length L3 of the opening 42 of the sealing member 40 extends to between approximately 25% and approximately 75% of a width W of the sealing member 40. According to an aspect, the length L3 of the opening 42 extends to more than approximately 25% and less than approximately 50% of the width W of the sealing member 40. In some embodiments, the length L3 of the opening 42 of the sealing member 40 may be longer than the length of the raked edge 32 and/or the length of the partially hemmed edge 26. (See, for instance, FIG. 3B.) In some embodiments, the opening 42 is a slit or other opening formed in the sealing member 40, typically having a substantially annular end 45. According to an aspect, the substantially annular end 45 may be enlarged with respect to the opening 42, and the opening 42 is configured to receive the partially hemmed edge 26. (See, for instance, FIG. 5.) The substantially annular end 45 may be configured to complement the partially hemmed edge 26 and/or help limit its movement beyond the length L3 of the opening 42 of the sealing member 40. In some embodiments, the substantially annular end 45 is positioned at a center 47 of the sealing member 40. In some embodiments, the substantially annular end 45 is positioned at a location other than the center 47 of the sealing member 40. Referring now to FIG. 4B, a side view of the sealing member 40 is shown, where the opening 42 of the sealing member is positioned along the longitudinal axis 46 of the sealing member 40.

In some embodiments, the sealing member 40 is made from a semi-flexible material and is configured for receiving and retaining the partially hemmed edge 26. As used herein, the term "semi-flexible" is meant to encompass any material that is capable of being at least partially flexible (i.e., capable of bending or being positioned or compressed against a rigid structure and losing some of its outer shape or of taking the shape of the structure against which it is compressed, without breaking, and while also capable of substantially maintaining the remainder of its shape or rigidity. It is also used to encompass the possibility that the sealing member 40 is resilient in a way that is both capable of substantially returning to its original shape when outside forces are removed, as well as capable of forming itself around or enveloping the partially hemmed edge 26, as described in greater detail hereinbelow. In an embodiment, the sealing member 40 is made from one or more of an organic fiber, an inorganic fiber and/or a metallic fiber in such a way that the "semi-flexible" characteristics described above are incorporated into the sealing member 40. In an embodiment, the sealing member 40 is made according to a process in which the fibers, threads or wires are entangled or assembled through needling, knitting, compression forming, weaving, and the like, to provide an internal mechanical bond sufficient to receive and retain the partially hemmed edge 26.

Figure 5:
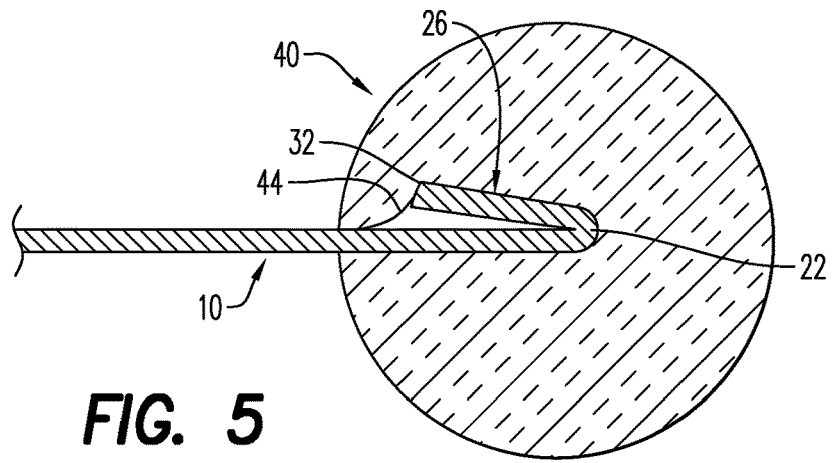
FIG. 5 is a cross-sectional view of a heat shield and sealing member, according to an embodiment.
Figure 6A:
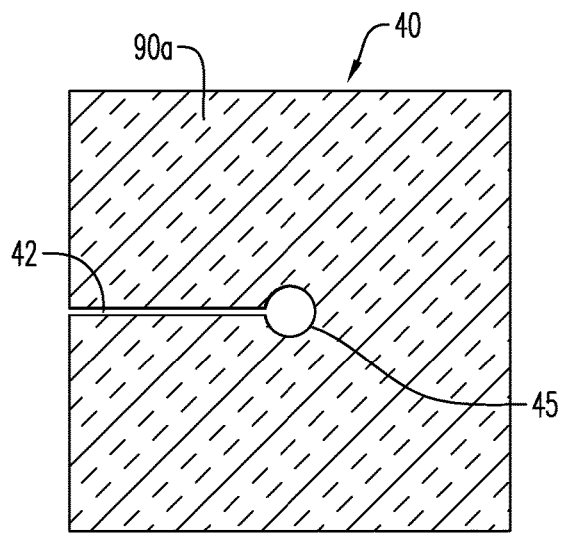
FIGS. 6A-6D is a cross-sectional view of a sealing member according to embodiments.
Figure 6B:
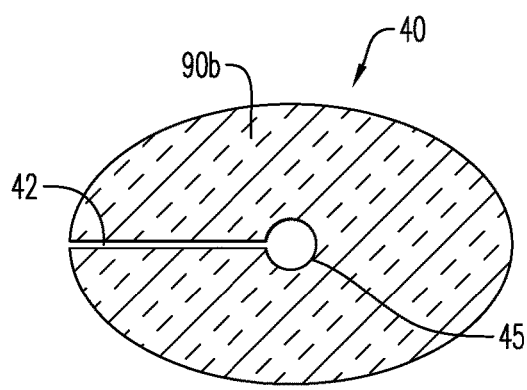
Figure 6C:
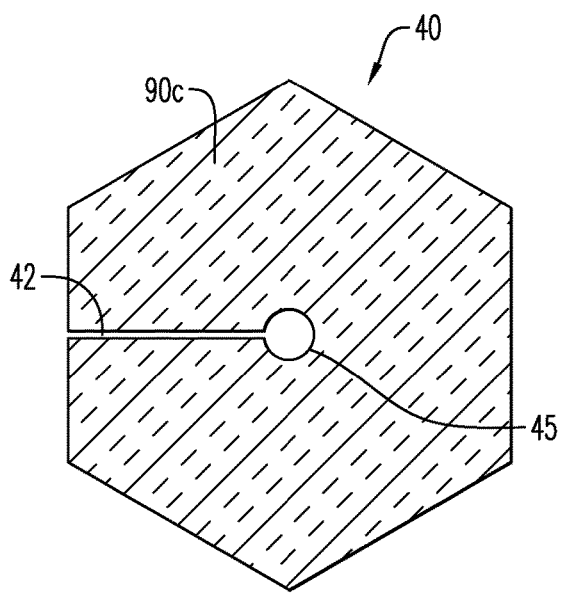
Figure 6D:
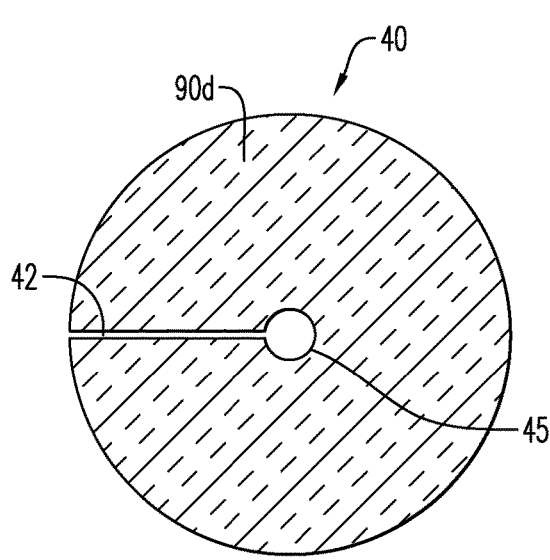
Figure 7A:
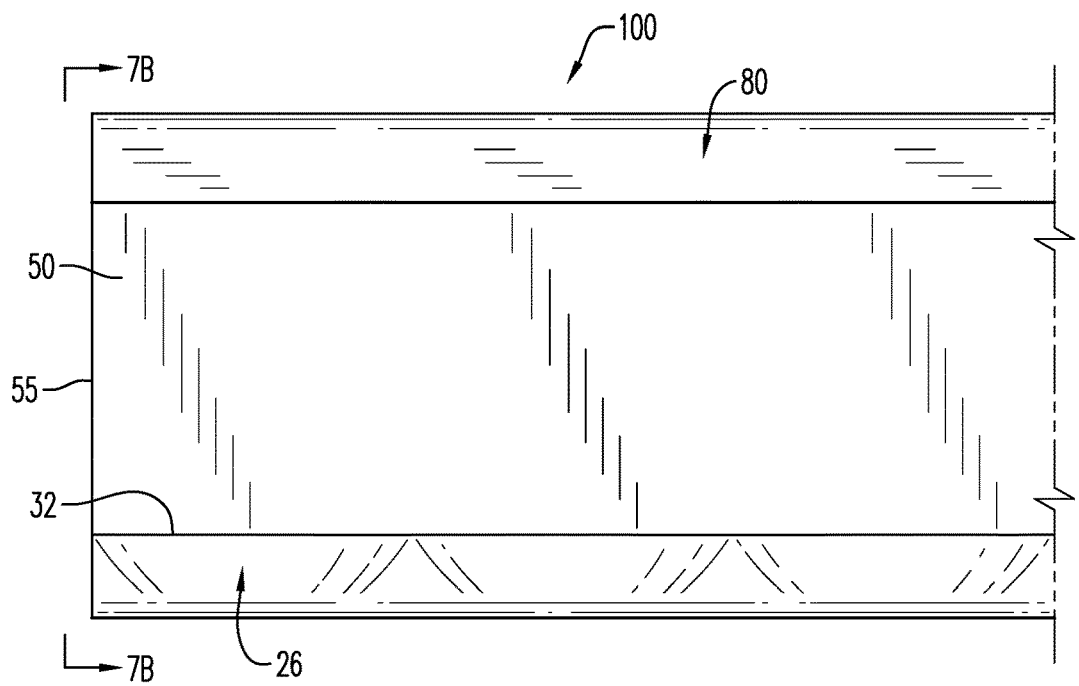
FIG. 7A is a top view of a heat shield having a partially hemmed edge, according to an embodiment.
Figure 7B:
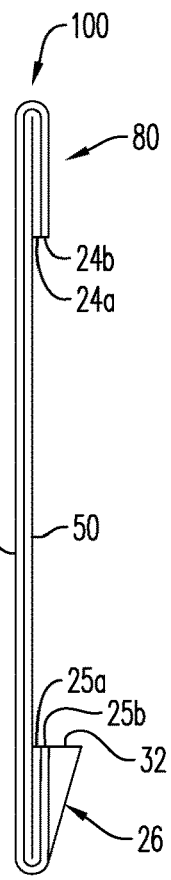
FIG. 7B is an end view of the heat shield of FIG. 7A, according to an embodiment.
Figure 7C:
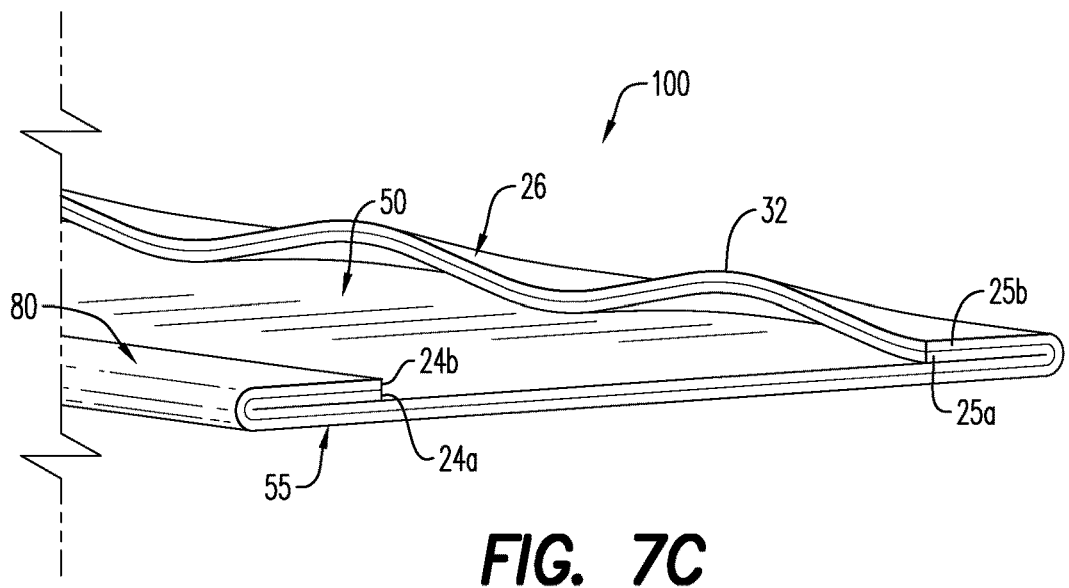
FIG. 7C is a side perspective view of the heat shield of FIG. 7A, according to an embodiment.
Figure 7D:
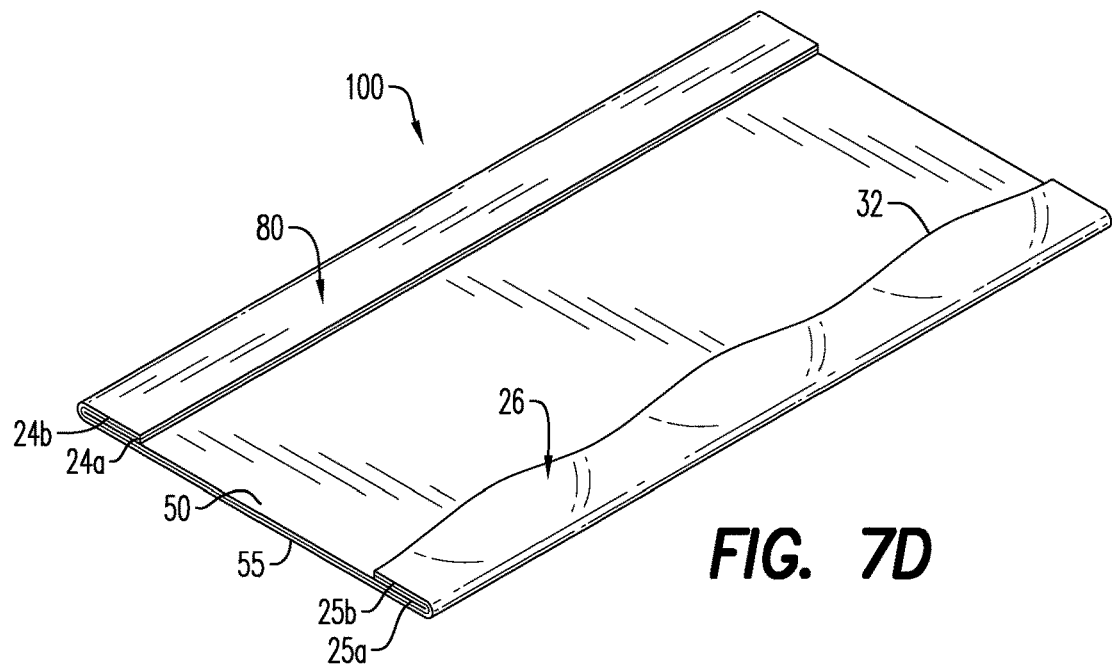
FIG. 7D is a side perspective view of the heat shield of FIG. 7A, according to an embodiment.
Figure 8:
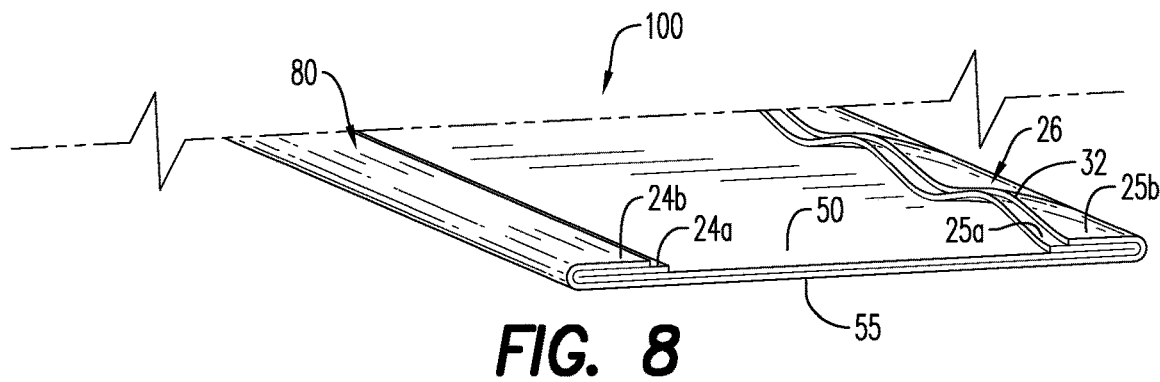
FIG. 8 is top view of a heat shield in an unassembled manner, having a partially hemmed edge and a fully hemmed edge, according to an embodiment.

As displayed in FIG. 5, the partially hemmed edge 26 of the heat shield 10 is inserted into the opening 42 of the sealing member 40. As shown and in an embodiment, the opening 42 is capable of deforming and opening to a width sufficient to receive the partially-hemmed edge 26 and a portion of the first portion 20 of the heat shield 10, and to essentially conform itself around these components received by the opening 42 after insertion therein. In an embodiment, the first end 22 of the first portion 20, or the edge of the raked edge 32, may be retained on an interior surface 44 formed by the opening 42. The retention of the sealing member 40 over the partially hemmed edge 26 is a function of both a shape of the partially hemmed edge 26, described in detail above and depicted in FIGS. 3C-3E, and the flexibility of the sealing member 40. The flexibility of the sealing member 40 allows the sealing member 40 to retain its shape before and after being assembled on the first end 22. The sealing member 40 may be positioned over at least a portion of the first end 22. In some embodiments, the sealing member 40 may be positioned only over the raked edge 32. According to an aspect, when positioned over the first end 22, the sealing member 40 provides a soft outer edge that limits, if not all together, eliminates air flow and/or fluid flow around the heat shield 10 in use.

The partially hemmed edge 26 may also be located at a position adjacent to the substantially annular end 45. In some embodiments, the sealing member is positioned around and over at least the raked edge 32 of the partially hemmed edge 26. If desired, the sealing member 40 may be positioned entirely over the partially hemmed edge 26.

Because heat shields 10 are customizable to form various shapes and fit tightly between various components, the sealing member 40 may be provided in a variety of configurations. Referring now to FIGS. 6A-6D, the cross-sectional shape of the sealing member 40 may be substantially one of a rectangular 90a, an elliptical 90b, a polygonal 90c, and a cylindrical 90d shape. Each of the aforementioned shapes allows the sealing member 40 to effectively close or otherwise seal a gap between heat shield 10 and an adjacent component. Such shapes may be selected based on, for example, the shape and size of the surface to be sealed.

As depicted in FIGS. 7A-7D and 8, a multi-layered shield 100 includes at least a first layer 50 and a second layer 55. As shown in FIGS. 7A-7D, the shield 100 includes a partially hemmed edge 26 along one edge of the shield, and a fully hemmed edge 80 along the opposite edge of the shield. As would be understood by one of ordinary skill in the art and as shown in the figures, the hemmed edges 26, 80 are generally formed by folding over at least a portion of the edges 25a, 25b and second ends 24a, 24b of the first and second layers 50, 55, respectively, to form the hemmed edge. (See, for instance, FIG. 7B.) Of course, as previously described, the partially hemmed edge 26 is formed with the raked edge 32, and is thus not entirely folded into the hemmed edge (as found in the fully hemmed edge 80).

As shown in FIGS. 7A-7D, the second layer 55 may be slightly larger than the first layer 50 since when folded over into the hemmed edges 26, 80, the edges 25a, 25b and the second ends 24a, 24b are aligned. Regarding FIG. 8, the second layer 55, on the other hand, may be the same size as or even slightly smaller than the first layer 50 since when folded over into the hemmed edges 26, 80, the edges 25a, 25b and the second ends 24a, 24b are not aligned.

In some embodiments, the first and second layers 50, 55 are not directly attached to each other. In other words, an inner layer of material (not shown) may be arranged between the first layer 50 and the second layer 50. The inner layer may be the same as the first layer 50 and the second layer 55. In some embodiments the inner layer is the same as at least one of the first layer 50 and the second layer 55. According to an aspect, the first and second layers 50, 55 are the same as each other, while the inner layer is different. Each of the first and second layers 50, 55 may be formed of one of more metallic layers, or composite/layered materials commonly including one nonwoven layer and at least one metallic layer. In some embodiments, the first and second layers 50, 55 are metallic layers, while the inner layer is the nonwoven layer. In any event, materials used to form the layers 50, 55 and/or the inner layer may be selected based on the particular needs of the application.

In some embodiments, the heat shield 10 provides insulative properties when positioned proximal to a thermal, acoustical and/or vibrational source 60. In some embodiments, the heat shield 10 including the sealing member 40 provides a fluid seal across the partially hemmed edge 26 of the heat shield 10. In some embodiments, the heat shield 10 provides at least one of a liquid seal and/or an airflow seal when abutted and/or compressed against a component 70. In some embodiments, the heat shield 10 may provide thermal insulation, vibrational insulation and/or acoustical insulation while limiting or preventing the passage of liquid and air through the contact surface of the component 70 and the sealing member 40.

In accordance with embodiments described herein, a heat shield 10 for one or more exhaust ports is provided. In other words, the source 60 to be shielded includes, in an embodiment, a single exhaust port, or an array of multiple exhaust ports. The heat shield includes a first portion 20, a second portion 30 and a sealing member 40. The first portion 20 has a first end 22 and a second end 24. The second portion 30 is integrally formed with the first end 22 of the first portion 20 and is configured to form a partially hemmed edge 26. The partially hemmed edge 26 includes a raked edge 32 and is adapted and configured to mechanically retain the sealing member 40 without the use of mechanical fasteners. The raked edge 32 varies along its edge/length and at least a portion of its length varies by an angle θ formed between the first portion 20 and the second portion 30. According to an aspect, the angle varies between 0 degrees and 180 degrees. The sealing member 40 has an opening 42 positioned along a longitudinal axis 46 of the sealing member 40. The sealing member 40 is positioned along at least a portion of the partially hemmed edge 26.

In some embodiments, the sealing member 40 includes a semi-flexible material formed from one of a ceramic fiber and a metallic fiber. The sealing member 40 may provide a fluid seal across the partially hemmed edge 26 of the heat shield 10. In some embodiments, the sealing member 40 may provide at least one of a liquid seal and/or an airflow seal when abutted and/or compressed against a component 70 adjacent to the exhaust port or ports. In some embodiments, the heat shield 10 provides insulative properties when positioned proximal to the thermal, acoustical and/or vibrational source 60.

In accordance with embodiments described herein, a method of using a heat shield 10 is provided, the heat shield including a first portion 20, a second portion 30 and a sealing member 40. In embodiments, the first portion forms the body of the heat shield and has a first end and a second end, the second portion of the heat shield is integrally formed with the first end, and the sealing member has a soft edge. The method includes: forming a partially hemmed edge; shaping the partially hemmed edge to form a raked edge; positioning the sealing member over and around the partially hemmed edge; positioning the now assembled heat shield over a source; and positioning the sealing member in a compressing/abutting arrangement with a component of the source. The method may further include forming a fully hemmed edge along at least a portion of the shield, while forming the partially hemmed edge along another portion of the shield. In embodiments, the partially hemmed edge may be formed by folding the second portion over at least a surface of the first portion of the heat shield. The sealing member has an opening, such as a slit, with a length and depth capable of receiving the partially hemmed edge. During assembly of the heat shield, the slit is forced apart by the hemmed edge, and in some embodiments the retention of the sealing member over the hemmed edge may be a function of the shape of the partially hemmed edge and the flexibility of the sealing member. When the heat shield is assembled and is in compressed/abutted contact with the component, the soft edge sealing member functions to limit, if not all together eliminate air flow and/or liquid flow around the shield, thus providing an insulative and/or sealing effect.

The heat shield components and methods illustrated are not limited to the specific embodiments described herein, but rather, features illustrated or described as part of one embodiment can be used on or in conjunction with other embodiments to yield yet a further embodiment. It is intended that the heat shield and associated method include such modifications and variations. Further, steps described in the method may be utilized independently and separately from other steps described herein.

While the heat shield and associated method has been described with reference to specific embodiments, it will be understood by those skilled in the art that various changes may be made and equivalents may be substituted for elements thereof without departing from the scope contemplated. In addition, many modifications may be made to adapt a particular situation or material to the teachings found herein without departing from the essential scope thereof.

In this specification and the claims that follow, reference will be made to a number of terms that have the following meanings. The singular forms "a," "an" and "the" include plural referents unless the context clearly dictates otherwise. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. In some instances, the approximating language may correspond to the precision of an instrument for measuring the value. Terms such as "first," "second," etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that variations in these ranges will suggest themselves to a practitioner having ordinary skill in the art and, where not already dedicated to the public, the appended claims should cover those variations.

Advances in science and technology may make equivalents and substitutions possible that are not now contemplated by reason of the imprecision of language; these variations should be covered by the appended claims. This written description uses examples to disclose the heat shield and associated method, including the best mode, and also to enable any person of ordinary skill in the art to practice these, including making and using any devices or systems and performing any incorporated methods. The patentable scope thereof is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A heat shield, comprising:
   a first portion having a first end and a second end;
   a second portion integrally formed with the first end of the first portion, the second portion configured to form at least a partially hemmed edge such that the partially hemmed edge provides a raked edge and an undulating edge extending along at least a portion of an axial length of the second portion, the undulating edge being formed by alternating a repeating pattern of a flattened portion and a raised portion; and
   a sealing member secured to the partially hemmed edge, the sealing member comprising a metallic wire mesh comprising a plurality of metal fibers, and having an opening positioned along a longitudinal axis of the sealing member,
   wherein the raised portion and the raked edge of the partially hemmed edge are adapted and configured to mechanically engage the plurality of metal fibers to retain the sealing member along at least a portion of the partially hemmed edge.

2. The heat shield of claim 1, wherein the sealing member comprises a semi-flexible material and is configured for receiving the partially hemmed edge, such that the retention of the sealing member by the partially hemmed edge is a function of both a shape of the partially hemmed edge and the semi-flexibility of the sealing member.

3. The heat shield of claim 2, wherein the semi-flexible material comprises at least one of an organic fiber and an inorganic fiber entangled with the metallic wire mesh.

4. The heat shield of claim 1, wherein the first and second portions of the heat shield comprises a first metallic layer, a second metallic layer, and a nonwoven layer sandwiched between the first and second metallic layers.

5. The heat shield of claim 2, wherein the partially hemmed edge is adapted and configured to mechanically retain the sealing member without using a mechanical fastener.

6. The heat shield of claim 1, wherein the opening is a slit comprising an annular end.

7. The heat shield of claim 6, wherein the annular end is positioned at a center of the sealing member.

8. The heat shield of claim 1, wherein the heat shield is a multilayered shield, the multilayered shield comprising a first layer and a second layer, wherein the first and second layers each comprise spaced apart partially hemmed edges comprising a plurality of flattened and raised portions.

9. The heat shield of claim 7, wherein the partially hemmed edge is retained on an interior surface of the opening, such that at least a portion of and wherein the partially hemmed edge is adjacent to the annular end.

10. The heat shield of claim 1, wherein a cross-sectional shape of the sealing member is one of a rectangular, an elliptical, a polygonal, and a cylindrical shape.

11. The heat shield of claim 1, wherein a length of the opening extends to between approximately 25% and approximately 75% of a width of the sealing member.

12. The heat shield of claim 1, wherein a length of the opening is longer than a width of the partially hemmed edge.

13. The heat shield of claim 1, wherein the heat shield provides insulative properties when positioned proximal to a thermal, acoustical and/or vibrational source.

14. The heat shield of claim 1, wherein the sealing member comprises a soft edge to provide a fluid seal across the partially hemmed edge of the heat shield.

15. A heat shield for shielding one or more exhaust ports, comprising:
   a first portion having a first end and a second end;
   a second portion integrally formed with the first end of the first portion, the second portion configured to form a partially hemmed edge such that the partially hemmed edge provides a raked edge and an undulating edge extending along at least a portion of an axial length of the second portion, wherein the undulating edge is formed by alternating a repeating pattern of a flattened portion and a raised portion; and
   a sealing member secured to the partially hemmed edge, the sealing member comprising a metallic wire mesh comprising a plurality of metal fibers, and having an opening positioned along a longitudinal axis of the sealing member, wherein
   the raised portion and the raked edge of the partially hemmed edge are adapted and configured to mechanically retain the sealing member without using a mechanical fastener to retain the sealing member along at least a portion of the partially hemmed edge, and
   at least a portion of a length of the raked edge varies by an angle formed between the first portion and the second portion.

16. The heat shield of claim 15, wherein the sealing member comprises a semi-flexible material comprising a ceramic fiber, wherein the ceramic fiber and the plurality of metal fibers are entangled together.

17. The heat shield of claim 15, wherein the sealing member comprises a soft edge to provide a fluid seal across the partially hemmed edge of the heat shield.

18. The heat shield of claim 1, wherein the sealing member and contours of the first portion and the second portion direct hot air flow away from the sealing member towards the second end of the first portion of the heat shield.

* * * * *